United States Patent [19]
Yerly et al.

[11] Patent Number: 4,812,984
[45] Date of Patent: Mar. 14, 1989

[54] METHOD AND DEVICE FOR MEASURING THE CUTTING FORCES AND LIMITING OVERLOADS OF THE CUTTING FORCE IN A PLATEN PRESS

[75] Inventors: Marcel Yerly, Chavannes; Klaus Christl, Ecublens, both of Switzerland

[73] Assignee: Bobst SA, Lausanne, Switzerland

[21] Appl. No.: 14,243

[22] Filed: Feb. 12, 1987

[30] Foreign Application Priority Data
Feb. 13, 1986 [CH] Switzerland .......................... 580/86

[51] Int. Cl.$^4$ .................. G01L 25/00; G06G 7/66
[52] U.S. Cl. .................. 364/474; 364/571.01; 364/474.19; 83/72; 73/1 B
[58] Field of Search .................. 364/475, 571; 73/1 B, 73/11, 760, 765, 767; 83/72-76, DIG. 1

[56] References Cited

U.S. PATENT DOCUMENTS

| | | | |
|---|---|---|---|
| 3,319,053 | 5/1967 | Roberts | 364/475 |
| 3,411,345 | 11/1968 | Wintriss | 73/760 |
| 4,466,318 | 8/1984 | Schoch | 83/62 |
| 4,484,285 | 11/1984 | deVersterre et al. | 364/472 |
| 4,658,921 | 4/1987 | Karpa | 73/1 B |

FOREIGN PATENT DOCUMENTS

0828014 5/1981 U.S.S.R. .................. 73/1 B

*Primary Examiner*—Parshotam S. Lall
*Assistant Examiner*—S. A. Melnick

[57] ABSTRACT

A device for measuring forces and avoiding overloads on platen presses includes a detection unit connected with a processing unit by a connection block. The processing unit includes an amplifying unit coupled with a calculation unit which is connected to a memory unit joined with a control unit for stopping the main motor of the platen press. The processing unit also is connected with a display unit which provides scale members for displaying the measured forces.

11 Claims, 8 Drawing Sheets

4,812,984

METHOD AND DEVICE FOR MEASURING THE CUTTING FORCES AND LIMITING OVERLOADS OF THE CUTTING FORCE IN A PLATEN PRESS

BACKGROUND OF THE INVENTION

The present invention is directed to a method and a device for measuring the cutting force and limiting the overload of the cutting force in a platen press.

At the present, it is known to measure the cutting force of a platen press by utilizing a sensor, for instance a deformation reading sensor which is located on one of the lateral frames of the machine. Thus, when the press is set under pressure for cutting a cardboard sheet, the forces acting on the frame increase and the sensor reads the deformation in the frame member and converts this into an electrical pulse which is then transmitted so that it can be displayed as a value relative to the cutting force.

Nonetheless, this kind of measure does not show the forces which readily act in the press since it was planned to measure them directly on the toggle transmitting the motion to the shiftable bed or platen used in this type of press. In that case, a set of four sensors, each one mounted on one of the toggles, is used. Nonetheless, if this solution is more satisfying than the first cited one, it does not yet allow the measuring of the real forces acting in the press during the cutting operation. Indeed, the lack of accuracy of these measures would allow the raising of the punctual overloads which in certain cases might destroy various members or parts of the press. The second example avoids the occurrence of the overloads, but the accuracy of the measuring is insufficient when the cutting force is low so that the measuring of the real force acting in all operation areas of the cutting unit is not warranted.

SUMMARY OF THE INVENTION

The object of the present invention is to provide a method and an apparatus or device for the accurate measuring of the cutting forces acting in a platen press and to avoid the drawbacks related to the previously known measuring methods.

These objects are obtained with a method for measuring the cutting forces and limiting the overload in a platen press having a pair of lateral frame members interconnected by an upper crossbar member forming a fixed bed, a lower crossbar member, a lower shiftable bed which is raised and lowered by pressing means including a toggle arrangement positioned between the lower crossbar member and the shiftable bed. The lateral frames have four deformation reading sensors mounted thereon. The method comprises the steps of calibrating the reading sensor by placing a first jack between the upper platen or bed and the lower shiftable bed at the center thereof, actuating the jack to bring it in engagement with both the upper and shiftable beds, and setting the readings of each of the sensors to zero, then determining the correction factor for the geometry of the lateral frame members by placing the jack under pressure, measuring the deformation at the lateral frame at the locations of each of the sensors and then calculating the correction factor for each of the sensors, then replacing the first jack with a second jack which is positioned offset from the center of the beds by a known value in both the X and Y direction, actuating the second jack to apply pressure between the lower and upper beds, measuring the deformation readings from the sensors and calculating a first fictitious lever arm for each of the forces measured by the sensors and a second fictitious lever arm for the forces acting on each of the toggles, combining the values of the first fictional lever arm and the second fictional lever arm, determining the gains in both the X and Y direction utilizing two directional amplifiers, calculating the forces acting on each of the bearings knowing the axial spacing between the bearings and the crankshaft for the toggle, determining the two gain direction factors for output amplifiers, memorizing the maximum values of the forces acting on each of the bearings of the crankshaft, displaying the memorized maximum values, comparing the memorized maximum values against maximum allowable forces, applying an output signal when the compared maximum value exceeds the allowable maximum force to stop the motor for the press and resetting the amplifying units and memorizing units after each sequence.

The device or apparatus for measuring the cutting forces in the press includes means for reading the deformation on the lateral frames of the cutting unit, means for correcting the value of the information given by said means for reading the deformation, means for calculating the forces acting on the bearings of a crankshaft driving the toggles of the cutting unit, means for memorizing the maximum values of the forces acting on the bearings of the crankshaft, means for comparing the maximum values of the forces with a maximum allowed value, means for continuously displaying the maximum forces, means for stopping the main motor of the platen press when the maximum value of the forces exceeds the allowable force and means for resetting the device.

The means for reading the deformation of the lateral frames is composed of four deformation reading meters such as strain gauges mounted against one face of each of the two lateral frames of the press. The strain gauges can be either extensometric gauges or piezo-electric quartz gauges. The means for correcting the values given by the deformation reading sensors comprise an amplifying unit comprising four amplfiers. The means for calculating the forces acting on the bearings of the crankshaft includes a calculation unit having an input amplifier, two directional amplifiers, one multiplier, and one divider and four output amplifiers. The means for memorizing the maximum values of the forces acting on the bearings is formed by a memory unit having four peak value memories. The means for comparing the maximum value of the forces on the bearings of the crankshaft with the maximum allowable values are comparators whose output is a signal created when the maximum value exceeds the allowable value and goes to a relay acting on a switch for the system. The means for continuously displaying the maximum value of forces acting on the bearings crankshaft comprises four scale members and the means for resetting the device comprises a cyclic programmer acting on the amplifying unit and the memory unit and a push button acting on the comparators.

BRIEF DESCRIPTION OF THE DRAWINGS

FIGS. 3a, 3b and 3c are detailed diagrams of FIG. 3 with FIG. 3a being along the X axis, FIGS. 3b and 3c being along the Y axis with FIG. 3b being the forces $F_A$ and $F_B$, while FIG. 3c shows the forces $F_D$ and $F_C$;

DESCRIPTION OF THE PREFERRED EMBODIMENTS

Figure 1:
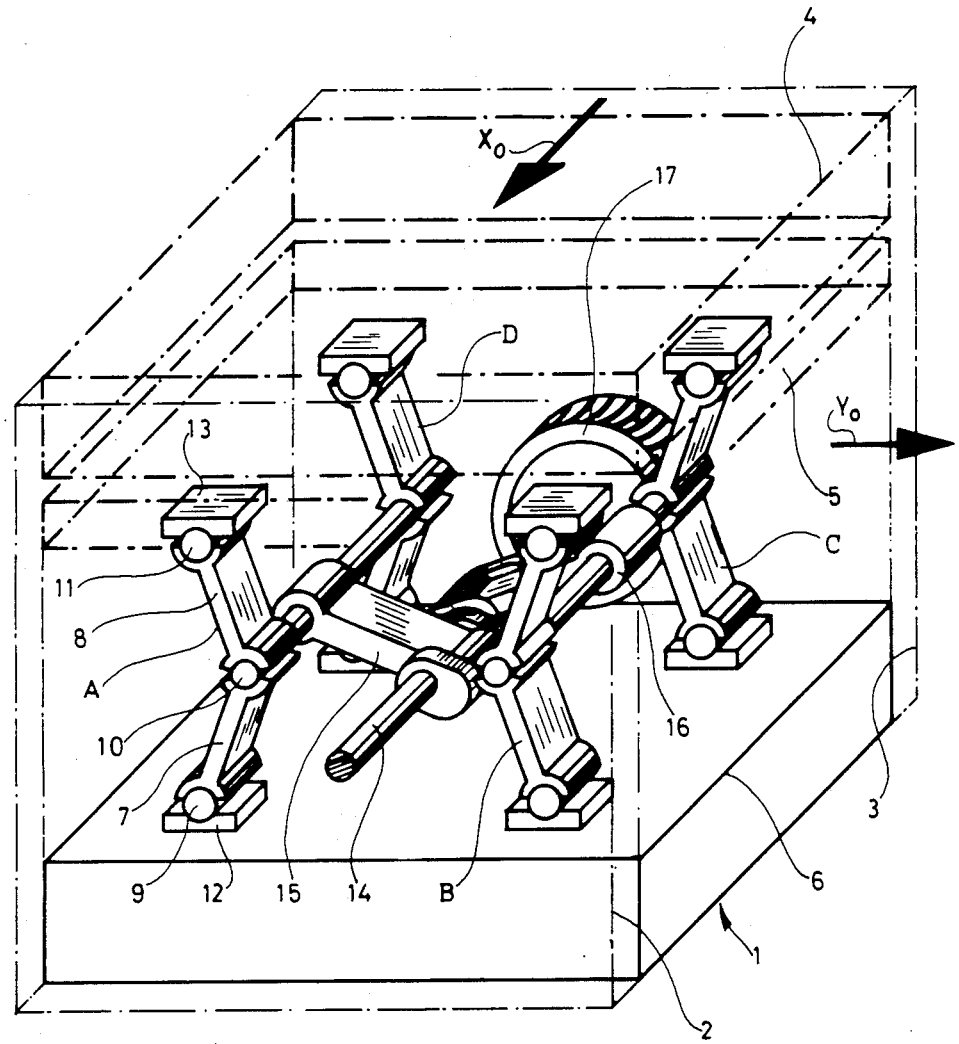
FIG. 1 is a perspective view of a cutting station of a platen press.

The principles of the present invention are particularly useful when incorporated in a platen press or cutting unit generally indicated at 1 in FIG. 1. The press or unit 1 will receive sheets which are moved in a direction of the arrow Yo. The press 1 includes lateral framed members 2 and 3 which are spaced apart by an upper crossbar or platen 4 and a lower crossbar or member 6. The lower crossbar 6 supports four toggles A, B, C, and D, and these toggles are attached between the lower crossbar or member 6 and a lower shiftable platen or bed 5. For the purposes of illustration, the two lateral frames 2 and 3, the upper platen 4 and the movable bed 5 are only shown in dot-dash lines.

Each of the toggles are composed of two levers 7 and 8 which are attached to axles 9, 10 and 11 with the axle 9 making a lower joint, the axle 10 making a middle joint and the axle 11 making an upper joint. The axle 9 for the toggle A rests on a sole plate or base plat 12 which is mounted on the lower cross member 6 and the plate 12 can be tightened or positioned for instance with the assistance of inclined planes or wedges so that the vertical position of the toggle A can be set independently in order to secure a correct leveling of the lower shiftable bed or platen 5. A lower head of the lever 7 is a half bearing which rests on the axle 9 and an upper head of the lever 7 is also a half bearing which acts with the axle 10 of the middle joint. The axle 10 also receives a lower head of the lever 8 and the lever 8 has an upper head which is constructed as a half bearing which partially surrounds the axle 11 of the upper joint and holds it against a sole plate or base plate 13 which is secured on the lower shiftable bed 5. The four toggles are built in the same manner and to keep the drawings as simple as possible, the numbers for the toggles B, C and D have been omitted.

In a chosen execution, the toggles A, B, C, and D are actuated by drive means comprising a crankshaft 14 which has an eccentric portion for two rods or pitmans 15 and 16. The end of the rod 15 is connected to the axle 10 for the toggles A and D, while the end of the rod 16 is connected to the axle for the toggles B and C. The crankshaft 14 supports a worm gear 17 which is driven by an endless screw which is not illustrated. Other devices for the control of the toggles like the one described in U.S. Pat. No. 4,466,318, whose disclosure is incorporated by reference thereto and corresponds to Swiss Pat. No. 652 967 of Dec. 13, 1985, could also be chosen for the present example. During the vertical shifting of the lower shiftable bed, the bed can be guided in slides which are not illustrated. The upper crossbar or bed 4 as well as the lower crossbar 6 could be connected with the lateral frames 2 and 3 by means such as screws which are not illustrated. In FIG. 1, the medium or middle joint is made of the axle 10 attached to a couple of toggles, for instance the pair of toggles A and D and the pair of toggles B and C. The crankshaft 14 could also be provided with four eccentric portions having four separate pitmans with one pitman connected to a separate toggle so that each toggle A, B, C and D has a pitman connected thereto. During the cutting operation, the lower shiftable bed or platen 5 with its cutting tool or form (which is not illustrated) is moved upward and presses against the lower face of the upper bed or platen 4 under the combined action of the crankshaft 14 and the four toggles A, B, C and D.

Figure 2:
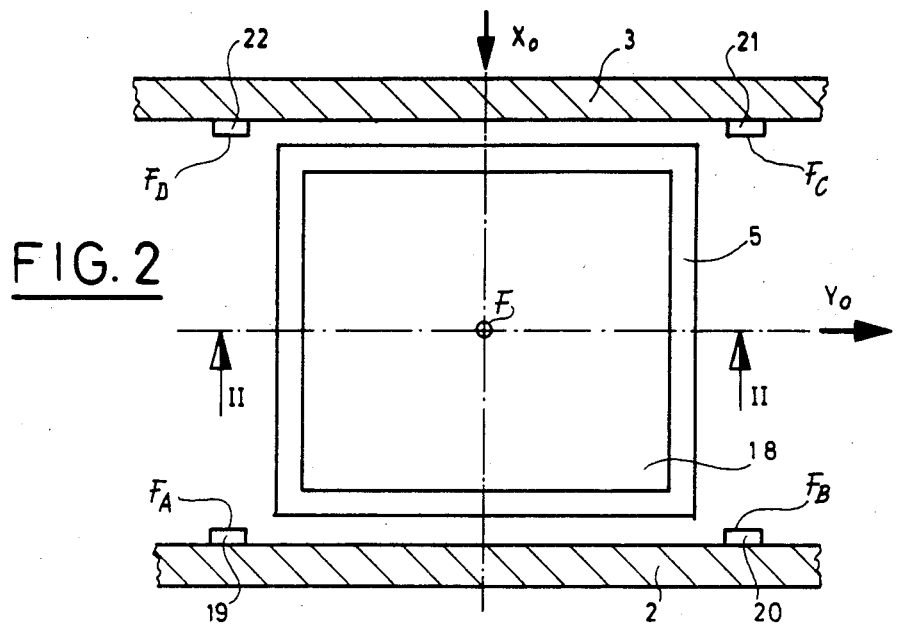
FIG. 2 is a first plan view of a lower shiftable platen or bed of the cutting station.
Figure 2A:
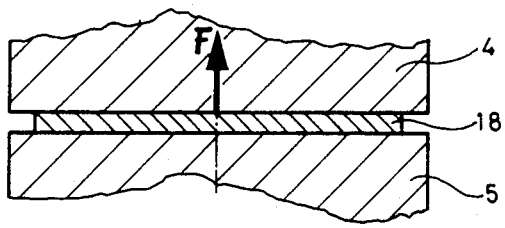
FIG. 2a is a cross sectional view taken along lines II—II of FIG. 2.
Figure 3:
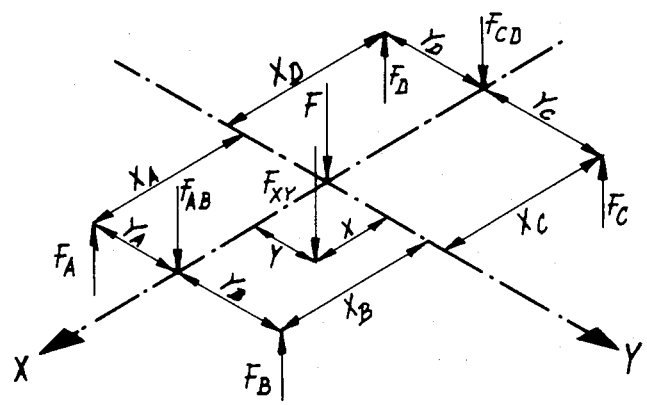
FIG. 3 is a perspective view of the cutting force diagram.
Figure 3A:
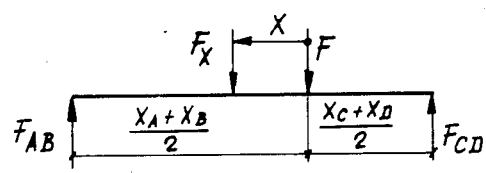
Figure 3B:
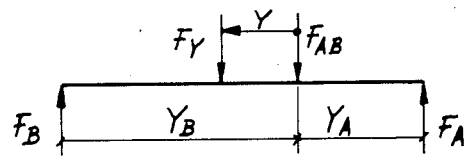
Figure 3C:
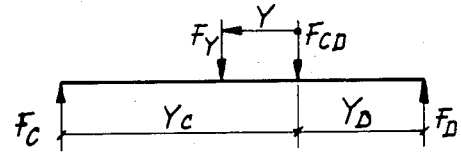

As best illustrated in FIG. 2, the lateral frame member 2 has two sensors 19 and 20 mounted thereon and the lateral frame member 3 has two sensors 21 and 22 mounted thereon. The sensors 19-22 are deformation reading sensors which measure the strain in the lateral frame members 2 and 3 at a given position. The first step of the method is to calibrate the sensors and this is done by placing a first hydraulic jack 18 having rectangular pressure surfaces and centering it in the center of the platen 5, as illustrated in FIG. 2, so the force acts on the center of the X and Y axes on the point $X_0$ and $Y_0$. The jack is shifted against the upper bed 4 and the lower shiftable bed 5 as illustrated in FIG. 2. When contact is made, all the sensors 19-22 are reset to a zero value. Since the assembly formed by the jack 18 and the lower bed 5 is absolutely symmetrical, the forces $F_A$, $F_B$, $F_C$ and $F_D$, which are measured by the sensors and as illustrated in FIGS. 3-3c are identical and shall be calculated with the formula $$F_A = F/4 = F_B = F_C = F_D \tag{1}$$

Figure 9:
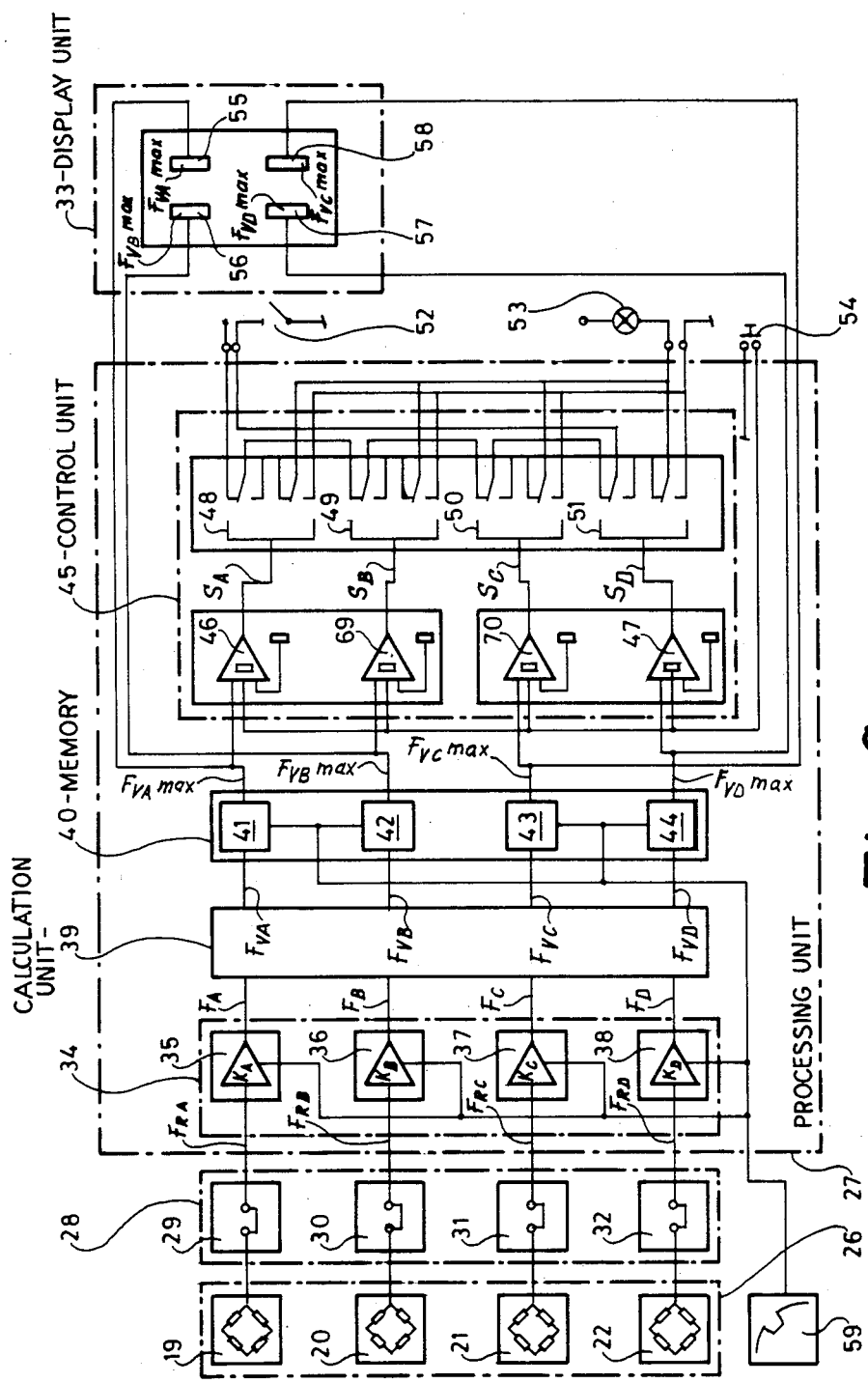
FIG. 9 is a schematic electrical circuit diagram of the detection and measuring circuit.

For the theoretical forces $F_{RA}$ to $F_{RD}$ acting on the sensors will depend on the geometry of the frame members 2 and 3 of the particular press or cutting unit 1. The gain $K_A$ to $K_D$ for the sensor amplifiers 35-38 of FIG. 9 are set with regard to the value F/4 at the output of each of the amplifiers 35-38 according to the formulas:

$$F_A = F_{RA} \cdot K_A \tag{2}$$

$$F_B = F_{RB} \cdot K_B \tag{3}$$

$$F_C = F_{RC} \cdot K_C \tag{4}$$

$$F_D = F_{RD} \cdot K_D \tag{5}$$

Figure 2B:
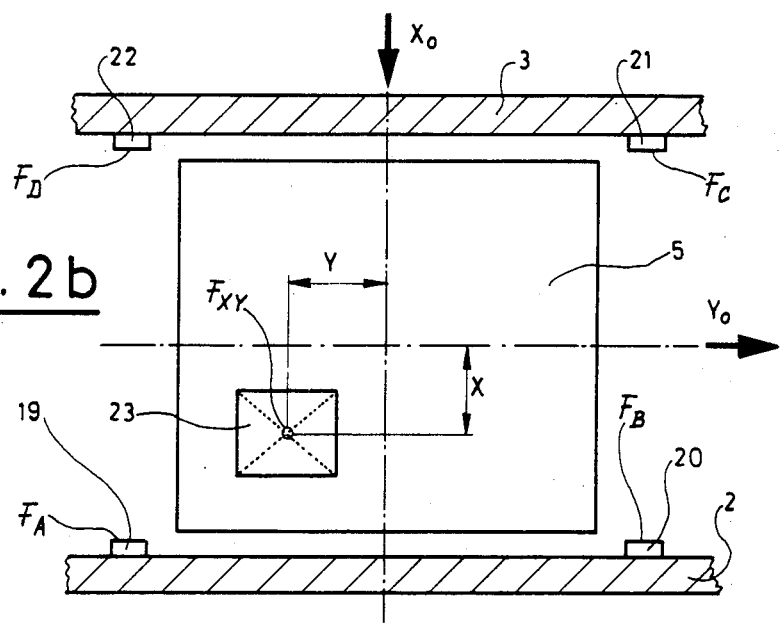
FIG. 2b is a second plan view of the lower shiftable platen or bed.

After calibrating the various gains $K_A$ through $K_D$, the next step is to replace the jack 18 with a second jack 23 which has a smaller pressure surface. As illustrated in FIG. 2b, the second jack 23 is positioned to be offset from the center of the $X_0$ axis and the $Y_0$ axis by a value X and Y respectively. For the calculations of the forces acting on the toggles by any cutting force, it is assumed that (1) the cutting force is a punctual force or point force shifted by a value X and Y from the center of the machine; and (2) each measured force is combined with fictitious lever arms $X_A$ to $X_D$ and $Y_A$ to $Y_D$ (as illustrated in FIGS. 3–3c).

In this case, the theoretical force $F_{AD}$ to $F_{DD}$ will be determined by the following formulas:

$$F_{AB} = F \cdot \frac{\frac{X_C + X_D}{2} + X}{\frac{X_A + X_B}{2} + \frac{X_C + X_D}{2}} = \quad (6)$$

$$F \cdot \frac{X_C + X_D + 2X}{X_A + X_B + X_C + X_D}$$

$$F_{CD} = F \cdot \frac{\frac{X_A + X_B}{2} - X}{\frac{X_A + X_B}{2} + \frac{X_C + X_D}{2}} = \quad (7)$$

$$F \cdot \frac{X_A + X_B - 2X}{X_A + X_B + X_C + X_D}$$

$$F_A = F_{AB} \frac{Y_B - Y}{Y_A + Y_B} = \quad (8)$$

$$\frac{F \cdot (X_C + X_D + 2X)(Y_B - Y)}{(X_A + X_B + X_C + X_D)(Y_A + Y_B)}$$

$$F_B = F_{AB} \frac{Y_A + Y}{Y_A + Y_B} = \quad (9)$$

$$\frac{F \cdot (X_C + X_D + 2X)(Y_A + Y)}{(X_A + X_B + X_C + X_D)(Y_A + Y_B)}$$

$$F_C = F_{CD} \frac{Y_D + Y}{Y_C + Y_D} = \quad (10)$$

$$\frac{F \cdot (X_A + X_B - 2X)(Y_D + Y)}{(X_A + X_B + X_C + X_D)(Y_C + Y_D)}$$

$$F_D = F_{CD} \frac{Y_C - Y}{Y_C + Y_D} = \quad (11)$$

$$\frac{F \cdot (X_A + X_B - 2X)(Y_C - Y)}{(X_A + X_B + X_C + X_D)(Y_C + Y_D)}$$

In these terms, it can be assumed that $F_A$, $F_B$, $F_C$ and $F_D$ are the forces measured when an offset jack is used. If the following three hypothesis are true $$X_A = X_B = X_C = X_D = X_3, \quad (a)$$

then the value $X_3$ can be the value of the fictitious lever arms in the X direction and the next hypothesis $$Y_A = Y_B = Y_C = Y_D = Y_3, \quad (b)$$

then $Y_3$ can be the value of the fictitious lever arm and $$F = F_A + F_B + F_C + F_D. \quad (c)$$

The hypothesis a, b, and c are fulfilled by choice of an adequate positioning of the sensors 19–22 on the lateral frames 2 and 3. By inserting these hypotheses in formulas 8–11, these formulas become:

$$F_A = F/4 \cdot \frac{(X_3 + X)(Y_3 - Y)}{X_3 \cdot Y_3} \quad (12)$$

$$F_B = F/4 \cdot \frac{(X_3 + X)(Y_3 + Y)}{X_3 \cdot Y_3} \quad (13)$$

$$F_C = F/4 \cdot \frac{(X_3 - X)(Y_3 + Y)}{X_3 \cdot Y_3} \quad (14)$$

$$F_D = F/4 \cdot \frac{(X_3 - X)(Y_3 - Y)}{X_3 \cdot Y_3} \quad (15)$$

Figure 10:
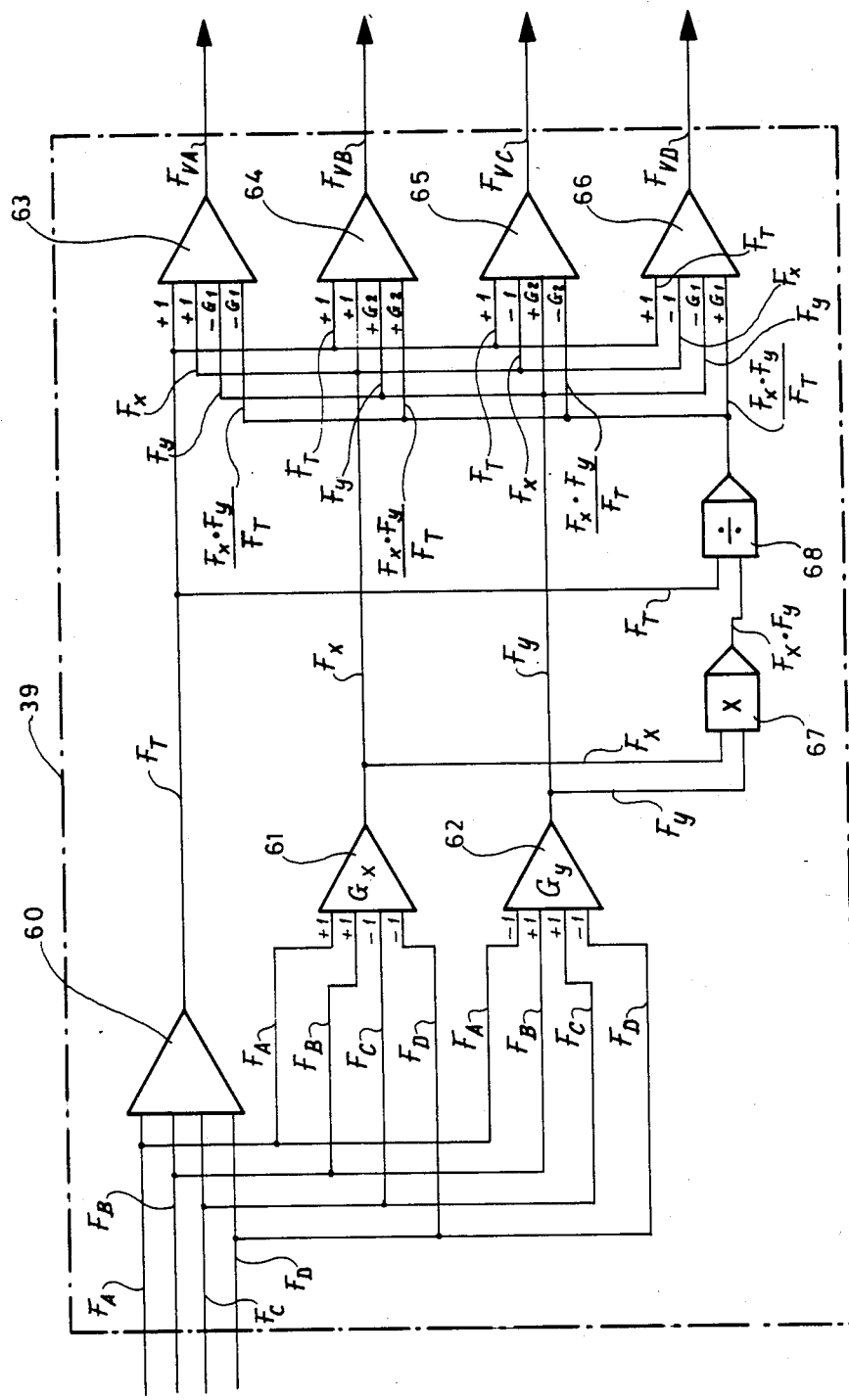
FIG. 10 is a schematic electrical circuit diagram of the calculating unit utilized in FIG. 9.

The value of the factor $X_3$ allows a partial calculation of the gain of an amplifier $G_X$ (see FIG. 10), and the value of a factor $Y_3$ provides a partial calculation of the gain of the amplifier $G_Y$ of FIG. 10. Assuming this, we have $$X = \frac{F_A + F_B - F_C - F_D}{F} \cdot X_3 = \frac{\Delta F_X}{F} \cdot X_3 \quad (16)$$

and $$Y = \frac{F_B + F_C - F_A - F_D}{F} \cdot Y_3 = \frac{\Delta F_Y}{F} \cdot Y_3 \quad (17)$$

Thus, during the calibration operations with the jack 23 in the offset position, the value of the factors $X_3$ and $Y_3$ can be calculated. Indeed values X, Y, $F_A$ to $F_D$ being known the values $X_3$ and $Y_3$ can be calculated.

$X_3$ and $Y_3$, being known or calculated, it will be possible when the cutting unit is set under pressure to calculate the values X and Y, and $F_A$ to $F_D$ as well as F can be measured or calculated. Thus, the point where the force F is to be applied for any cutting tool on the lower shiftable bed 5 can be calculated with accuracy.

Figure 4:
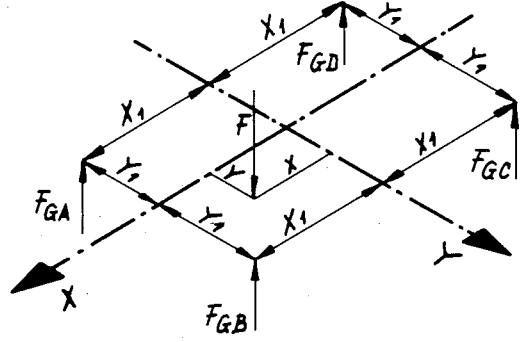
FIG. 4 is a perspective view of a diagram of forces acting on the toggles of the press.

The value of the forces acting on the toggles A-D can be determined in the same way. Referring to FIG. 4, $X_1$ is a fictitional lever arm for the forces $F_{GA}$ to $F_{GD}$ in the X direction. $Y_1$ is a fictitional lever arm for the forces $F_{GA}$ to $F_{GD}$ in the Y direction. Forces $F_{GA}$ to $F_{GD}$ are the forces acting on each toggle A–D. Force F is created by the jack 23 and X and Y measure the offset position for the force F. On the analogy of the preceeding theory, it can be declared that:

$$F_{GA} = \frac{F}{4} \cdot \frac{X_1 + X}{X_1} \cdot \frac{Y_1 - Y}{Y_1} = \quad (18)$$

$$\frac{F}{4} \left( 1 + \frac{X}{X_1} - \frac{Y}{Y_1} - \frac{XY}{X_1 Y_1} \right)$$

$$F_{GB} = \frac{F}{4} \cdot \frac{X_1 + X}{X_1} \cdot \frac{Y_1 + Y}{Y_1} = \quad (19)$$

$$\frac{F}{4} \left( 1 + \frac{X}{X_1} - \frac{Y}{Y_1} - \frac{XY}{X_1 Y_1} \right)$$

$$F_{GC} = \frac{F}{4} \cdot \frac{X_1 - X}{X_1} \cdot \frac{Y_1 + Y}{Y_1} = \quad (20)$$

$$\frac{F}{4} \left( 1 - \frac{X}{X_1} - \frac{Y}{Y_1} - \frac{XY}{X_1 Y_1} \right)$$

and

-continued $$F_{GD} = \frac{F}{4} \cdot \frac{X_1 - X}{X_1} \cdot \frac{Y_1 - Y}{Y_1} = \quad (21)$$

$$\frac{F}{4}\left(1 - \frac{X}{X_1} - \frac{Y}{Y_1} - \frac{XY}{X_1 Y_1}\right)$$

By replacing X and Y by the formulas defined hereinabove, we shall obtain $$(22)$$

$$F_{GA} = \frac{F}{4}\left(1 + \frac{\Delta F_X \cdot X_3}{F_{X1}} - \frac{\Delta F_Y \cdot Y_3}{F_{Y1}} - \frac{\Delta F_X \cdot \Delta F_Y \cdot X_3 \cdot Y_3}{F^2 X_1 Y_1}\right)$$

then $$(23)$$

$$F_{GA} = \frac{F}{4} + \frac{X_3}{4X_1} \cdot \Delta F_X - \frac{Y_3}{4Y_1} \cdot \Delta F_Y - \frac{\Delta F_X \cdot \Delta F_Y \cdot X_3 \cdot Y_3}{4F X_1 Y_1}$$

If it assumed that $$F_X = G_X \cdot \Delta F_X \quad (24)$$

and $$F_Y = G_Y \cdot \Delta F_Y \quad (25)$$

the result is $$G_X = \frac{X_3}{4X_1} \quad (26)$$

and $$G_Y = \frac{Y_3}{4Y_1} \quad (27)$$

The values $G_X$ and $G_Y$ are the gain correction values for the sensors 19-22. It is also assumed that $$F_T = \frac{F}{4} = \sum_{A}^{D} \frac{F}{4} \quad (28)$$

replaces in the $F_{GA}$ formula, the result is $$F_{GA} = F_T + F_X - F_Y - \frac{F_X \cdot F_Y}{F_T} \quad (29)$$

$$F_{GB} = F_T + F_X + F_Y + \frac{F_X \cdot F_Y}{F_T} \quad (30)$$

$$F_{GC} = F_T - F_X + F_Y - \frac{F_X \cdot F_Y}{F_T} \quad (31)$$

$$F_{GD} = F_T - F_X - F_Y + \frac{F_X \cdot F_Y}{F_T} \quad (32)$$

Figure 6:
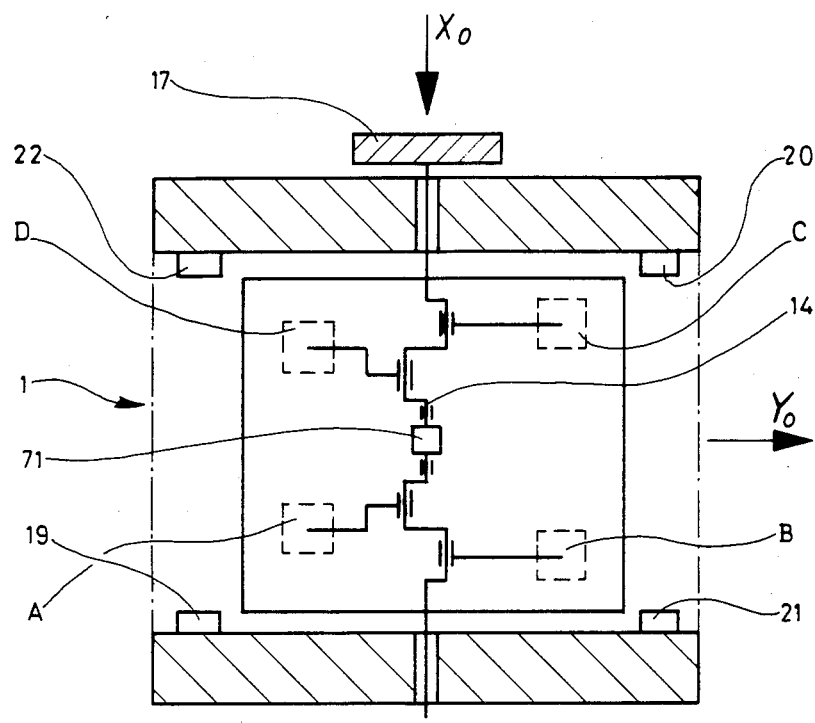
FIG. 6 is a plan view of the schematic illustration of FIG. 5 with portions removed for purpose of illustration.
Figure 6A:
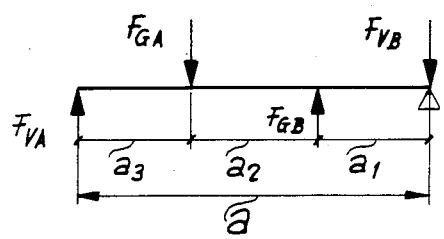
FIGS. 6a and 6b are two diagramatic view of the forces acting on the crankshaft bearings.
Figure 6B:
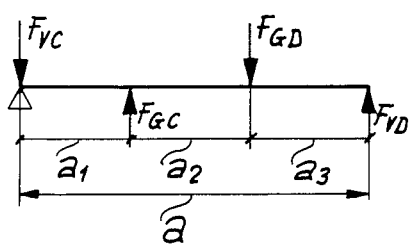

Consequently, it can be calculated that the force $F_{VA}$ to $F_{VD}$ acting on the crankshaft 14 as shown in FIGS. 6a and 6b is known from the formulas of the force acting on the toggles A-D. Referring to FIGS. 6a and 6b where $F_{GA}$ to $F_{GD}$ are forces acting on the toggles, $F_{VA}$ to $F_{GD}$ are the forces acting on the crankshaft bearings and $a_1$ to $a_3$ are the distances between the crankshaft bearings. We obtain $$F_{VA} = F_{GA} \cdot \frac{a_2 + a_1}{a} - F_{GB} \cdot \frac{a_1}{a} = F_{GA} \cdot A'_1 - F_{GB} \cdot A'_2 \quad (33)$$

$$F_{VB} = F_{GB} \cdot \frac{a_2 + a_3}{a} - F_{GA} \cdot \frac{a_3}{a} = F_{GB} \cdot A'_3 - F_{GA} \cdot A'_4 \quad (34)$$

$$F_{VC} = F_{GC} \cdot \frac{a_2 + a_3}{a} - F_{GD} \cdot \frac{a_3}{a} = F_{GC} \cdot A'_3 - F_{GD} \cdot A'_4 \quad (35)$$

$$F_{VD} = F_{GD} \cdot \frac{a_2 + a_1}{a} - F_{GC} \cdot \frac{a_1}{a} = F_{GD} \cdot A'_1 - F_{GC} \cdot A'_2 \quad (36)$$

If $F_{GA} = F_{GB} = F_{GC} = F_{GD}$, it can be assumed that $$F_{VX} = F_{GX}, \text{ and then} \quad (37)$$

$$\frac{A'_1 - A'_2}{A_{12}} = 1 \Longrightarrow A_{12} = \frac{a_2 + a_1 - a_1}{a} = \frac{a_2}{a}, \quad (38)$$

and $$\frac{A'_3 - A'_4}{A_{34}} = 1 \Longrightarrow A_{12} = \frac{a_2 + a_3 - a_3}{a} = \frac{a_2}{a} \quad (39)$$

introducing these results in $F_{VA}$ to $F_{VD}$, we obtain $$F_{VA} = F_{GA} \cdot \frac{a_2 + a_1}{a_2} - F_{GB} \cdot \frac{a_1}{a_2} = F_{GA} \cdot A_1 - F_{GB} \cdot A_2 \quad (40)$$

$$F_{VB} = F_{GB} \cdot \frac{a_2 + a_3}{a_2} - F_{GA} \cdot \frac{a_3}{a_2} = F_{GA} \cdot A_3 - F_{GB} \cdot A_4 \quad (41)$$

$$F_{VC} = F_{GC} \cdot \frac{a_2 + a_3}{a_2} - F_{GD} \cdot \frac{a_3}{a_2} = F_{GC} \cdot A_3 - F_{GD} \cdot A_4 \quad (42)$$

$$F_{VD} = F_{GD} \cdot \frac{a_2 + a_3}{a_2} - F_{GC} \cdot \frac{a_1}{a_2} = F_{GD} \cdot A_1 - F_{GC} \cdot A_2 \quad (43)$$

by referring to the equations of the forces $F_{GA}$ to $F_{GD}$ and inserting them into $F_{VA}$ to $F_{VD}$, then we gain the correction factors $G_1$ and $G_2$ are known as $$G_1 = A_1 + A_2 = \frac{2a_1 + a_2}{a_2}, \text{ and} \quad (44)$$

$$G_2 = A_3 + A_4 = \frac{2a_3 + a_2}{a_2} \quad (45)$$

$$F_{VA} = F_T + F_X - G_1 \cdot F_Y - G_1 \frac{F_X \cdot F_Y}{F_T} \quad (46)$$

$$F_{VB} = F_T + F_X + G_2 \cdot F_Y + G_2 \frac{F_X \cdot F_Y}{F_T} \quad (47)$$

$$F_{VC} = F_T - F_X + G_2 \cdot F_Y - G_2 \frac{F_X \cdot F_Y}{F_T} \quad (48)$$

$$F_{VD} = F_T - F_X - G_1 \cdot F_Y + G_1 \frac{F_X \cdot F_Y}{F_T} \quad (49)$$

Figure 5:
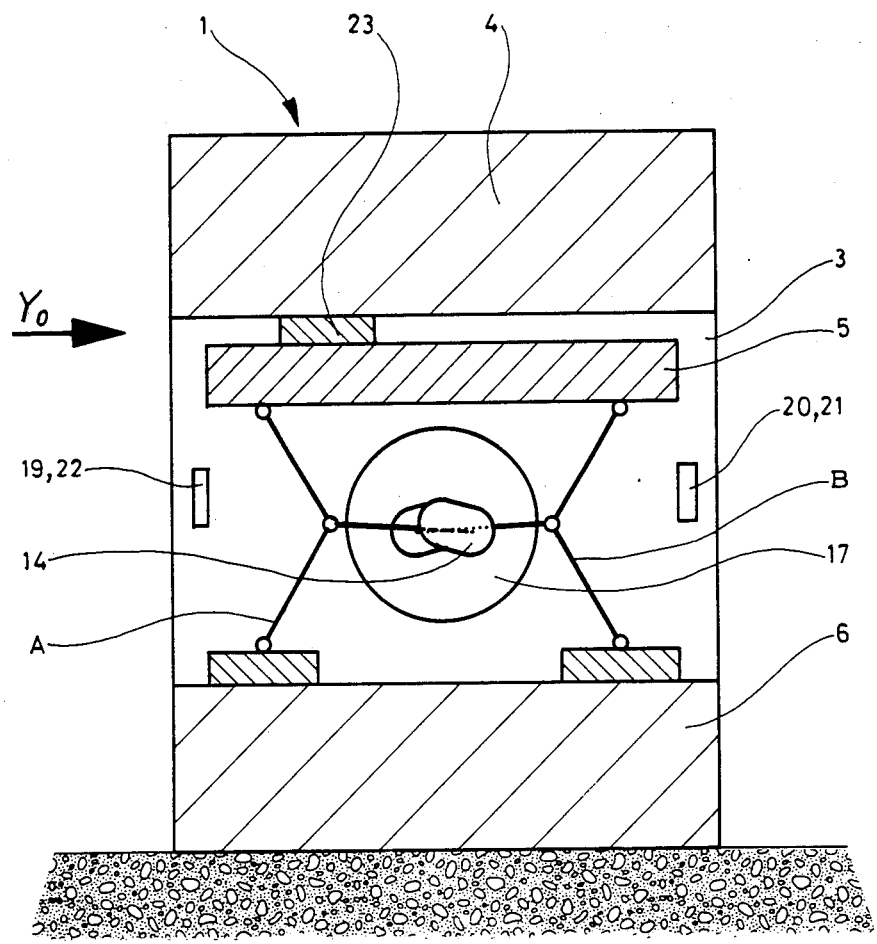
FIG. 5 is a schematic side view of a cutting station of a toggle press in accordance with the present invention.

FIGS. 5 and 6 illustrate the cutting unit or platen press 1 showing particularly in a schematic way the arrangement of the toggles A to D and the crankshaft 14 with a four bearing execution (the crankshaft as illustrated in FIG. 6 is made of two parts connected by a coupler 71). The positions of the sensors 19-22 is also shown in both FIGS. 5 and 6 and FIG. 5 shows the use of the jack 23 in an offset position.

Figure 7:
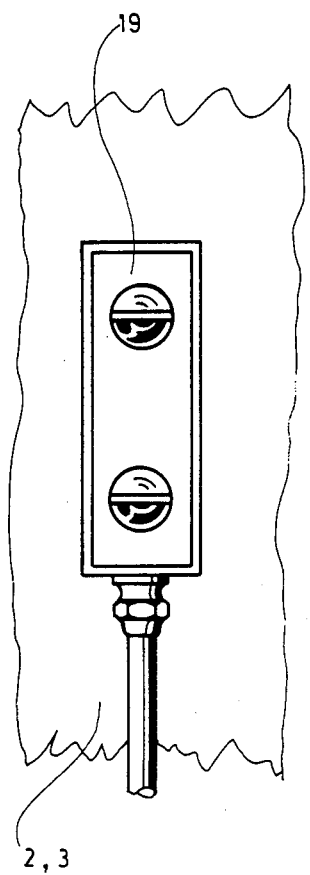
FIG. 7 is a elevational view of a deformation reading sensor.
Figure 8:
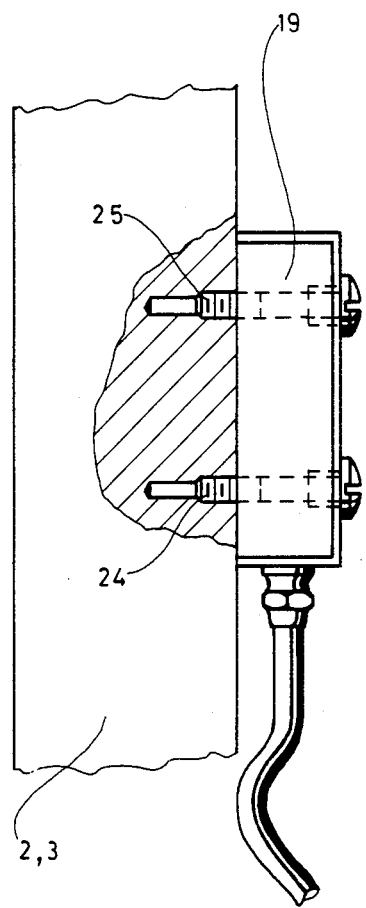
FIG. 8 is a side view of the sensor of FIG. 7 with portions removed for purpose of illustration.

FIGS. 7 and 8 show one of the sensors 19-22. The chosen example refered to is a deformation reading sensor with an extensometric gauge or strain gauge. Such sensors are currently available and will, therefore, not be described any further. Of course, inductive sensors or piezo-electric strain gauge sensors could also be used. All of the sensors 19-22 are secured on one face of the respective surface of the frame members 2 and 3 by screws such as 24 and 25.

FIG. 9 shows a schematic diagram of the detection and measuring circuit. The circuit includes a detection unit 26 made of the sensors 19-22. These sensors 19-22 are connected with a processing unit 27 by means of a connecting block 28 consisting of boxes 29-32. The value of the forces $F_{VA}$ to $F_{VD}$ on the crankshaft 14 is displayed by displaying unit 33 which is connected to the processing unit 27. The processing unit 27 has an amplification unit 34 comprising of amplifiers 35-38. The amplification unit is connected to a calculation unit 39 which will be described later with regard to FIG. 10. The calculation unit 39 is connected to the memory unit 40 which has four memories 41-44 for peak values. The memory unit 40 is connected to the control unit 45 which acts on the main motor circuit of the machine to order its immediate stop in case of an overload. This control unit is made up of four comparators 46, 47, 69 and 70, as well as four relays 48-51.

In this circuit, the signals are processed as follows: the value $F_{RA}$ measured by the sensor 19 for the toggle A is introduced in the amplifier 35, where it is balanced with the gain correction factor $K_A$ to give an output value of $F_A$ (see formula 2). The value $F_A$ is then introduced in the calculation unit 39 which processes it in accordance with the following discussion for FIG. 10 to obtain a value $F_{VA}$ (see formula 46), which is the force supported by the crankshaft bearing corresponding to or associated with toggle A. The value of this force $F_{VA}$ is then introduced in the memory 41 of the memory unit 40, and this memory 41 will only retain the maximum value of the force $F_{VA}$ and send it to the comparator 46 of the control unit 45, The comparator 46 is calibrated with regard to a maximum allowable force corresponding to the maximum cutting force of the machine. If the value for the maximum allowable force is exceeded, the comparator 46 will send an overload information signal $S_A$ to a relay 48. If the signal $S_A$ hits the relay 48, the relay is actuated to break the circuit for the switch 52 of the main motor of the machine to stop the machine. The value of the force $F_{VA}$ max issued by the memory 41 of the memory unit 40 is also sent to a display unit 33 where, thanks to the memorization, it can remained displayed even after an overload has stopped operation.

The same processing is used for the elements referred to in the values $F_{RB}$ to $F_{RD}$ given by the sensors 20, 21 and 22, respectively.

In case of an overload in one of the circuits corresponding to the rods A-D, a signal lamp 53 is also lighted. If an overload occurs, the device has to be reset with the push button 54. Thus, the device is started back to the starting condition and a new measuring operation can take place as soon as the cause of the overload is eliminated. The elimination of the overload, for instance, can be obtained by placing adequate equilibrium wedges on the face of the lower bed 5. The position for the wedges can easily be determined by reading the values of the force $F_{VA}$ to $F_{VD}$ displayed by the display unit 33 and balancing the forces on the bed by fixing the wedges opposite the overload point displayed unit which has scale members 55-58.

The cutting unit is work sequentially. This means that the cutting operation takes place for each complete turn or revolution of the crankshaft and that the amplification unit 34 and the memory unit have to be reset for each working cycle or revolution of the crankshaft. A well-known cyclic programmer 59, for instance a notch disk cooperating with a magnetic proximity detector, is used for the cyclic programmer and this notched disk is driven by the crankshaft in a one-to-one ratio.

In FIG. 10, a schematic diagram of the calculation unit 39 is illustrated and the unit includes an input amplifier 60 receiving signals of the forces $F_A$ to $F_D$ from the amplification unit 34 of FIG. 9. The input amplifier 60 has a $\frac{1}{4}$ gain value, thus the value measured at its output will be equivalent to the value $F_T$ as shown by formula 28. Each force $F_A$ to $F_D$ is sent to the first directional amplifier 61 for the forces in the direction X and the second direction amplifier 62 for the forces in the direction Y. The first amplifier 61 has a gain $G_X$ (obtained from formula 26) and the second amplifier has a gain $G_Y$ (obtained from formula 27). The input $F_A$ and $F_B$ of the directional amplifier 61 are multiplied by a coefficient plus 1 whereas the input $F_C$ and $F_D$ are multiplied by a coefficient minus 1. Thus, the output value will indeed correspond to the term $F_X$ as provided in formula 24, wherein $\Delta F_X = F_A + F_B - F_C - F_D$. The inputs $F_A$ and $F_D$ of the directional amplifier 62 are multiplied by a coefficient minus 1 and the input $F_B$ and $F_C$ are multiplied by a coefficient plus 1, giving a formula $F_Y$ according to formula 25 wherein $\Delta F_Y = F_B + F_C - F_A - F_D$. The values of the forces $F_{VA}$ to $F_{VB}$ of the crankshaft bearings are calculated with the values $F_X$ and $F_Y$ and $F_T$. Therefore, to obtain the terms $F_{VA}$ to $V_{VD}$ corresponding with the formulas of 46-49, the values $F_X$, $F_Y$ and $F_T$ are to be sent to the four output amplifiers 63-66. The input values of the first output amplifier 63 are the forces $F_T$ and $F_X$ multiplied by a +1 and forces $(F_X \cdot F_Y)/F_T$ and $F_Y$ multiplied by a coefficient $-G_1$ (see equation 44 as input value). The input values for the second amplifier 64 are the forces $F_T$ and $F_X$ multiplied by +1 and the forces $(F_X \cdot X_y)/F_T$ and $F_Y$ multiplied by a coefficient $+G_2$. The input values of the third amplifier 65 are the force $F_T$ multiplied by a +1 and force $F_X$ multiplied by $-1$, force $F_Y$ multiplied by a coefficient $+G_2$ and the forces $(F_X \cdot F_Y)/F_T$ multiplied by a coefficient $-G_2$. The input values of the fourth amplifier 66 are the forces $F_T$ multiplied by a +1, force $F_X$ are multiplied by a $-1$, force $F_Y$ multiplied by a coefficient $-G_1$ and the forces $(F_X \cdot F_Y)/F_T$ multiplied by a coefficient $+G_1$. To calculate the force $(F_X \cdot F_Y)/F_T$, the forces $F_X$ and $F_Y$ are sent to a multiplier 67 and the output $F_X \cdot F_Y$ of this multiplier is processed with the force $F_T$ in a divider 68.

The operator using the device like the one described herebefore can thus measure the real forces acting on the elements of the machine. Moreover, as at any moment, the four point measure allows the calculation of the point where to act, he can rapidly and readily adjust the cutting tool to provide an equilibrium of the forces.

Although various minor modifications may be suggested by those versed in the art, it should be understood that we wish to embody within the scope of the patent granted hereon all such modifications as reasonably and properly come within the scope of our contribution to the art.

We claim:

1. A method for measuring the cutting forces and limiting the overloads of a platen press with the steps comprising providing a platen press having a pair of lateral frames supporting four deformation reading sensors and being held apart by a fixed upper stationary bed and a lower cross member, said press having pressing means having a crankshaft and driven by a motor positioned on the lower cross member to actuate toggles to move a lower shiftable bed towards the fixed upper bed, said press having control means including a processing unit having two directional amplifiers and four output amplifiers, a memory unit with a plurality of outputs, and a comparator for each of the outputs of the memory unit; calibrating the deformation reading sensors by positioning a first jack in the center of the shiftable bed and operating the first jack to engage the fixed platen, and then setting the sensors at a zero value as the first jack engages the fixed bed; determining a correction factor for the geometry of the lateral frame members by placing the first jack under pressure, measuring the deformation of the lateral frames at the location of the sensors and then calculating the correction factors; removing the pressure of the first jack and replacing the first jack with a second jack offset by a known value in X and Y directions between the lower shiftable bed and the upper bed; actuating the second jack to apply pressure between the fixed upper bed and the shiftable bed, measuring the force of deformation from each of the sensors, calculating a first fictitious lever arm for the forces measured by the sensors, and calculating a second fictitious lever arm for the forces acting on each of the toggles, combining the values of the first and second fictitious lever arms, determining the gain of the two directional amplifiers in the control unit and with the known axial distance between the bearings of the crankshaft for the pressing means calculating the forces acting on the bearings, and determining the correcting factors for the output amplifiers; memorizing the maximum value of the forces acting in the bearing, displaying the maximum value of the forces acting on the bearings of four scale members of a display unit and comparing the maximum allowable value to the maximum measured value, creating an overload signal when the measured value exceeds the allowable value and applying the overload signal to a relay system to stop the motor of the press; and then resetting the processing and memory units when repeating the cycle.

2. A device for measuring the cutting forces and preventing overload of a press having lateral frame members connected by a fixed upper bed, a fixed lower cross member, a toggle drive arrangement connected to a main motor of the press acting between the lower cross member and a movable bed, said device including means for sensing deformation of the lateral frame members of the press, means for correcting the values of the information given by said means for sensing the deformation to produce a corrected values, means for calculating the forces acting on the bearings of a crankshaft for driving the toggles from the corrected values, means for memorizing the maximum values of the forces acting on the bearings, means for comparing the maximum values of the forces with maximum allowable values, means for continuously displaying the maximum values of forces, means for stopping the main motor of the press with regard to the result of the comparing of the maximum values with the maximum allowable values and means for resetting the device.

3. A device according to claim 2, wherein the means for sensing the deformation of the lateral frames are made of four deformation reading sensors mounted against one face of each frame.

4. A device according to claim 3, wherein the deformation reading sensors are extensometric gauges.

5. A device according to claim 3, wherein the reading sensors are piezo-electric quartz sensors.

6. A device according to claim 3, wherein the means for correcting the values given by the four deformation reading sensors is made of an amplification unit comprising four amplifiers with one amplifier for each sensor.

7. A device according to claim 2, wherein the means for calculating the forces acting on the bearings of the crankshaft comprises a calculation unit with an input amplifier, two directional amplifiers, one multiplier and one divider and four output amplifiers.

8. A device according to claim 2, wherein the means for memorizing the maximum values of the forces comprises a memory unit having four peak value memories.

9. A device according to claim 2, wherein the means comparing the maximum values of the forces to the maximum allowable values includes a comparator and wherein the means stopping the main motor of the press comprises relays acting on a switch actuated by an output signal from the comparator.

10. In a device according to claim 2, wherein the means for continuously displaying the maximum values of the forces acting on the bearings comprises four scale members and that the means for resetting the device comprises both a cyclic programmer acting on an amplification unit of the means for correcting and on a memory unit of the means for memorizing and a push button acting on comparators of the means for comparing.

11. A device according to claim 2, wherein the means for continuously displaying the maximum values of the forces acting on the bearings comprises four scale members, wherein said means for memorizing has a memory unit, wherein said means for correcting has an amplification unit, wherein said means for comparing includes comparators and wherein the means for resetting the device comprises both a cyclic programmer acting on said amplification unit and on the memory unit and a push button acting on comparators of the means for comparing.

* * * * *